United States Patent [19]

Malcolm

[11] Patent Number: 4,508,276

[45] Date of Patent: Apr. 2, 1985

[54] CURRENT LIMITED ELECTROSTATIC SPRAY GUN SYSTEM WITH POSITIVE FEEDBACK CONTROLLED CONSTANT VOLTAGE OUTPUT

[75] Inventor: David H. Malcolm, Randolph, N.J.

[73] Assignee: Titan Tool Inc., Oakland, N.J.

[21] Appl. No.: 428,024

[22] Filed: Sep. 29, 1982

[51] Int. Cl.³ .......................... B05B 5/00; H02H 3/00

[52] U.S. Cl. .................................... 239/691; 239/707; 361/93

[58] Field of Search ....................... 239/691, 706, 707; 361/225-228, 93, 98; 239/690; 118/620, 663, 708

[56] References Cited

U.S. PATENT DOCUMENTS

| | | | |
|---|---|---|---|
| 3,893,006 | 7/1975 | Algeri et al. | 361/227 |
| 4,266,262 | 5/1981 | Haase, Jr. | 239/691 |

*Primary Examiner*—Andres Kashnikow
*Assistant Examiner*—James R. Moon, Jr.
*Attorney, Agent, or Firm*—Nims Howes Collison & Isner

[57] ABSTRACT

Electrostatic spray coating system wherein the output voltage is maintained constant over the working range of the system and wherein the power is automatically interrupted whenever the load current exceeds a predetermined amount, as for example, about 120 microamperes.

13 Claims, 5 Drawing Figures

CURRENT LIMITED ELECTROSTATIC SPRAY GUN SYSTEM WITH POSITIVE FEEDBACK CONTROLLED CONSTANT VOLTAGE OUTPUT

This invention relates to electrostatic spray coating systems wherein the deposition of coating materials upon a workpiece is enhanced through the application of electrostatic forces and particularly to an improved system wherein the operating voltage is maintained substantially constant over the working range of the unit and wherein the power is interrupted whenever the current exceeds a predetermined value.

Electrostatic spray coating systems of both the air atomized and airless types are widely utilized in paint spraying and for deposition of other coating materials. Spray gun apparatus conventionally employed therein is generally constituted by an insulating barrel member having a grounded handle or mount disposed at one end thereof and a needle like high voltage electrode extending from the other end thereof disposed adjacent to the locus of atomization. Such electrode is usually charged to a potential in the neighborhood of from 30 to 85 kilovolts, and in certain installations as high as 150 kilovolts, to create a corona discharge condition and a concomitant electric field of appreciable magnitude. Under such conditions, the corona discharge current flowing from the high voltage electrode creates a region adjacent to the locus of atomization rich in unipolar ions that attach themselves to and charge the paint or other coating material spray droplets. Alternatively, for conductive coating materials contact charging of the spray droplets will occur in the high field strength region around the fluid orifice. The charged droplets are then displaced, under the conjoint influence of their own inertial forces and the electrostatic field extant in the spray region, toward a grounded workpiece. In accord with the conventional practice, maximum paint savings are generally effected by maintaining the charging voltage as high as possible and of such magnitude as to produce an average depositing field strength of at least 5,000 volts/inch, and preferably as high as 10,000 volts/inch, between the spray gun and the workpiece. As a concomitant thereto, the spray velocity in the vicinity of the workpiece should be of minimal magnitude consistent with the demands of adequate atomization and paint flow.

The requisite charging voltages are conventionally obtained either through the utilization of externally located standard electronic high voltage power supplies; by the incorporation of an electrogasdynamic high voltage generator within the spray gun body, or more recently, by the incorporation of turbine driven generator means and an electronic multiplier within the spray gun. The standard electronic high voltage power supplies, which are relatively large, heavy and expensive, and the turbogenerator power supplies are so constituted as to inherently function with essentially "constant voltage" type characteristics. In addition thereto and because of the magnitude of the potentials involved, the high voltage cable interconnecting a standard power supply with the spray gun is heavy, bulky and relatively inflexible, adding undesired weight to the gun assembly which, because of the concomitant high voltage insulation requirements is rendered unduly large, complex and in many instances not field serviceable.

While the electrogasdynamic powered spray coating apparatus is possessed of several advantageous features as compared to the standard high voltage power supplies, such conventionally require external generation of the relatively low, but still multi-kilovolt, excitation potentials for the spray apparatus contained electrogasdynamic generator and require the use of preconditioned or "seeded" air for reliable operation thereof.

Electrostatic spray guns utilizing electronic constant voltage power supplies, which constitute by far the majority of systems sold and in use, require the use of a protective resistor of large magnitude, typically of 200 to 300 megohms, to limit current under short circuit conditions to a safe level, such level being preferably 200 microamperes or less. This is particularly true of those systems employing an external power supply and where the long coaxial high voltage power cable has considerable capacitance (typically 1,000 picofarads) and stores a considerable amount of charge. Other "constant voltage" type systems such as those employing a turbogenerator power supplier, have a voltage multiplier unit within the spray gun and thus eliminate the requirement for the high voltage cable. In these systems the effective capacitance in the output is considerably lower than the 1,000 picofarads associated with a coaxial cable and consequently such units do not require such a high value of protective resistor. In these systems, a resistor of 100 megohms or less is usually adequate.

The use of such high value protective resistors in series with the output of a constant voltage type power supply gives rise to a straight line current voltage operating characteristic typically of the type shown in FIG. 1. As is apparent therefrom, the typical working voltage as shown by the intersection of the load line with the current voltage curve is usually as much as 25% lower than the open circuit voltage of the system. This lowered available voltage results in a considerably lower transfer efficiency of coating material than would be obtained if the output voltage could be maintained at the higher no load voltage throughout the working range of the spray device. To obtain this higher working voltage in such conventional systems would require a porportionately higher constant voltage type power supply output to provide commensurately higher no load voltages and concomitant higher stresses in the electronic components and the electrical insulation of the gun.

The use of smaller values of protective resistor in such type power supplies would operate to reduce the voltage drop under load but would also result in commensurate increase in the short circuit current of the system. It is generally recognized that short circuit currents of greater than 200 microamps can cause ignition of solvent vapors in an electrostatic system and consequently are both dangerous and undesirable. It is also apparent that the portion of the current voltage characteristic curve following between the typical working load line and short circuit condition is not a useful working zone in any practical sense since the voltages in this area are too low for efficient operation of the electrostatic spray system.

This invention may be briefly described as an improved power supply for electrostatic spray apparatus in which a substantially constant high voltage is supplied throughout the working range of the spray device and which will automatically shut down the system when the current level exceeds a predetermined value in excess of that characteristic of the working range currents but still well below the recognized safety limit of about 200 microamperes. In its broader aspects the invention includes a current limited power supply for electrostatic spray coating devices having a positive feedback voltage control that produces a substantially constant voltage output over the effective working range of the device. In its narrower aspects the improved power supply includes means to convert a conventional 110 volt 60 cycle voltage into stable regulated dc voltage, oscillator, amplifier, transformer and voltage multiplying means to provide a voltage output in the 50–150 kilovolt range and associated sensing means to determine the load on the high voltage output and to modify the amplifier voltage amplification in such manner that the output voltage of the multiplying means increases by an amount approximately equal to the additional voltage drop in the protective resistor and multiplier caused by the increased current occasioned by load increases. Associated therewith is means to shut down the power supply whenever the sensed load current exceeds a predetermined value.

Among the manifold advantages attendant practice of the subject invention is the provision of a power supply for an electrostatic spray coating system that has a substantially constant output voltage over the normal working range and automatically cuts off when the load current exceeds a predetermined value well below a safe value thereof, suitably about 200 microamperes. Other advantages attendant to and flowing from such improved voltage-current characteristic is a markedly higher efficiency of electrostatic paint spray operations and attendant savings in paint or other coating materials.

The primary object of this invention is the provision of an improved power supply for electrostatic spray coating equipment.

Another object of this invention is the provision of a power supply for electrostatic spray coating system that provides a substantially constant voltage over the normal working range of the spray device and which automatically cuts off when the working load current exceed that characteristic of the working range, but is at a level safely below the ignition level for the coating materials employed.

Still another object of the present invention is the provision of a cartridge type power supply for electrostatic spray guns wherein at least part of the power supply components are removably mounted in the gun.

Other objects and advantages of the subject invention will become apparent from the following portions of this specification and from the appended drawings which illustrate, in accord with the mandate of the patent statutes, a presently preferred construction incorporating the principles of this invention.

Referring to the drawings

Figure 1:
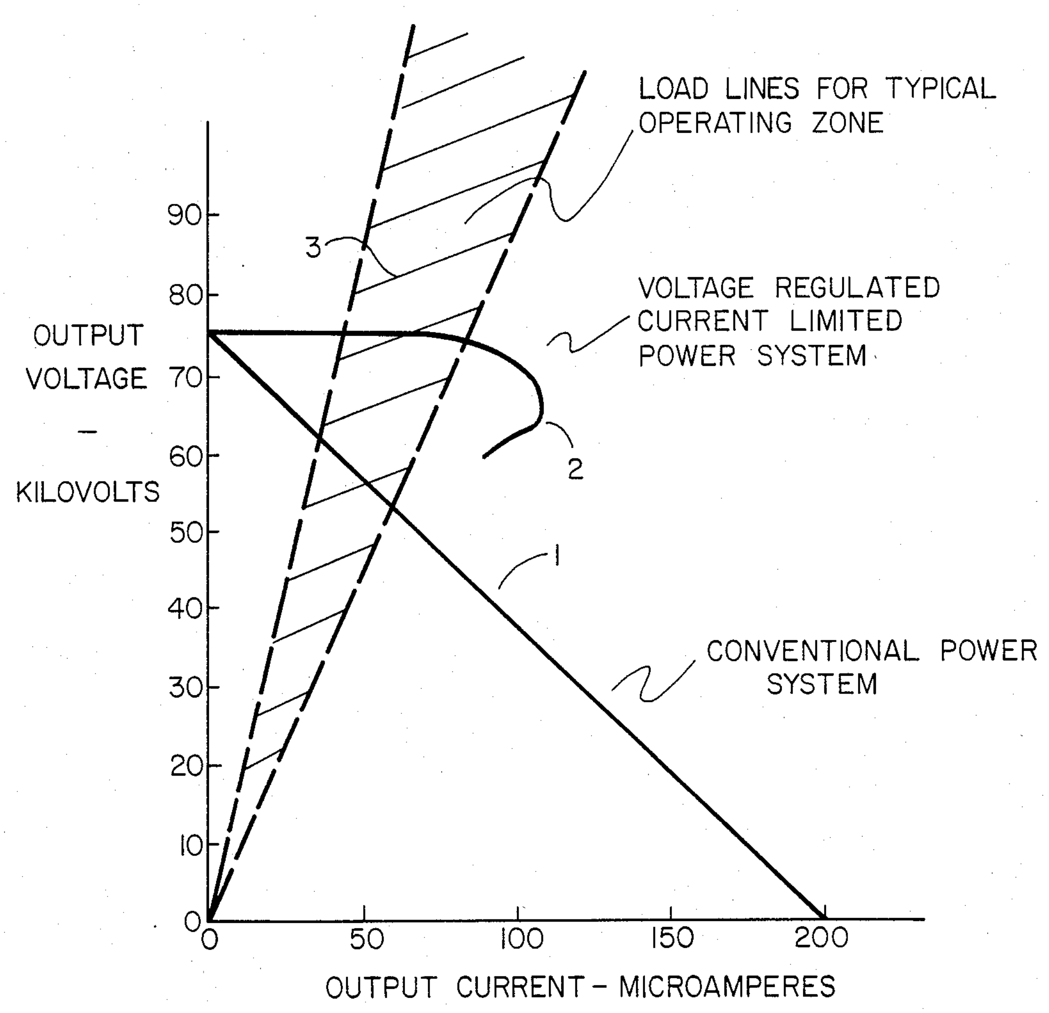
FIG. 1 is a graph schematically illustrating the voltage current characteristics for typical electrostatic spray system power supplies, and in comparison therewith, the voltage-current characteristics of a power supply for a system constructed according to the teachings of this invention.

Referring to the drawings and initially FIG. 1 there is shown a plot of the typical straight line voltage-current characteristic 1 of the conventional constant voltage type power supply used in conjunction with limiting protective resistors, and the voltage-current characteristic 2 for a power supply built according to the teachings of this invention. The dotted lines 3 are indicative of a normal working range for a unit and show by interconnection with curve 1, that the actual operating voltage i.e. 53–62 kv are well below the no-load voltage of 75 kv. In contrast herewith the spray systems employing the present invention, i.e. curve 2, maintains an essentially constant voltage at or near the no load voltage through such operating range.

In a similar manner it should also be noted that in contrast to the short circuit current of 200 microamperes for the conventional system as shown in curve 1, the system of this invention as shown by curve 2 actually provides for a voltage-current cut off well before an ignition current can be reached.

Figure 2:
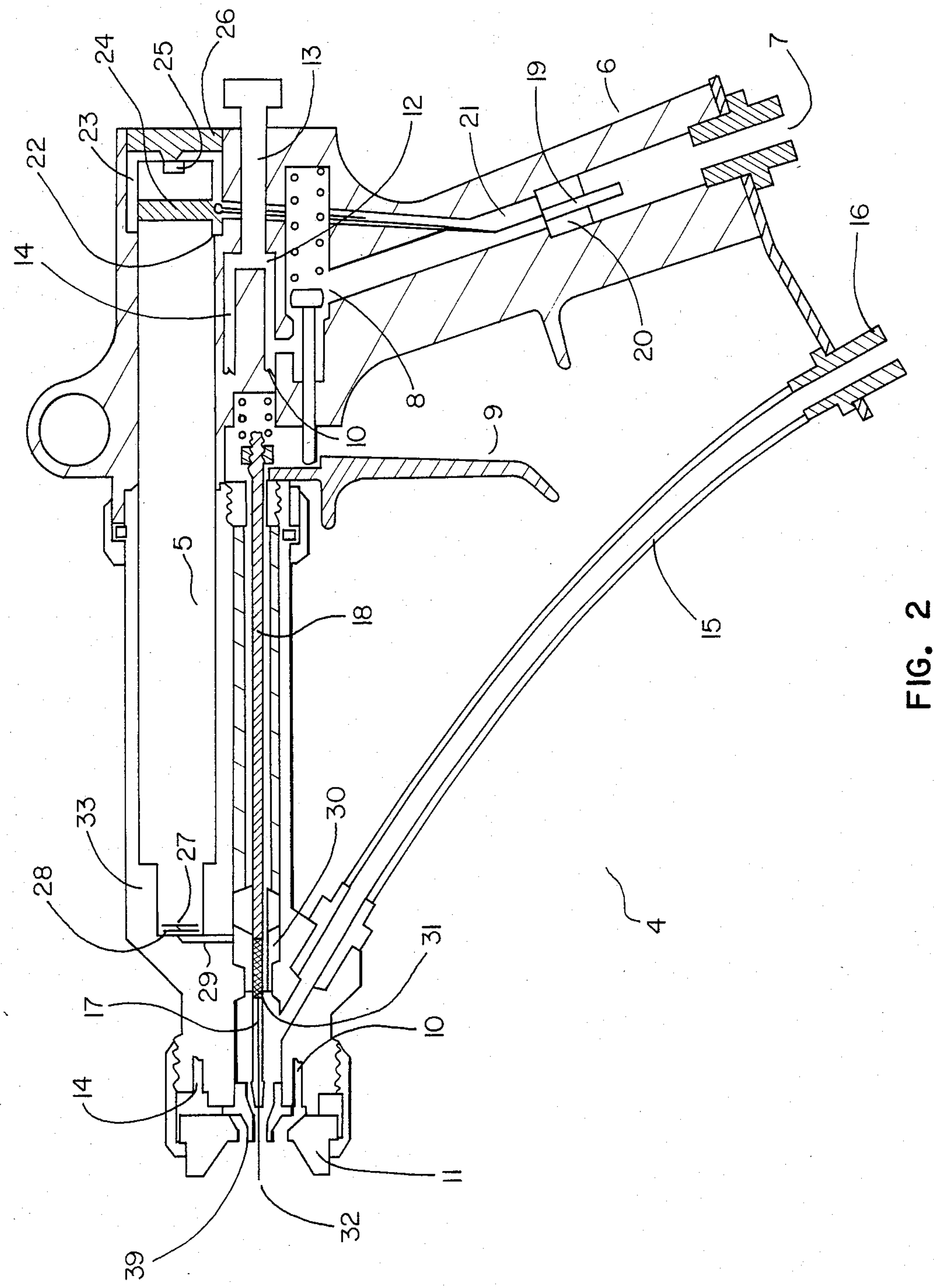
FIG. 2 is a schematic side elevational view, partly in section showing a hand manipulable spray gun of the air atomizing type incorporating the principles of this invention.

Referring now to FIG. 2, there is depicted the basic components of a hand held air atomizing electrostatic spray gun, generally designated 4, and showing the disposition therein of a cartridge 5 constructed in accord with the teachings of this invention. Disposed within a metal pistol type handle 6 is an air flow conduit 7 terminating at a control valve 8 operable through displacement of a trigger 9. The output side of the control valve is connected by a first conduit 10 to an aircap assembly, generally designated 11, and by a second conduit 12 to a fan shaping valve 13. The fan shaping valve is connected by a third conduit 14 through an elongated insulated barrel member 33 to the aircap 11. Coating fluid is introduced into the gun through conduit 15 connected, for safety reasons, by a metal fitting 16 to the grounded handle of the gun. The conduit 15 passes the coating fluid to the nozzle when the fluid flow control needle 17 permits flow through the nozzle when trigger operation operates to retract the needle via the insulated shaft assembly 18.

Disposed within the air inlet conduit 7 is a power input electrode assembly 19 insulated by the porous bushing 20 from the grounded handle, and connected by a wire 21 to a spring connector pin 22 at the rear end of the cartridge chamber 23. The connector pin 22 makes contact with the connector ring 24 of the cartridge 5. The ground pin 25 of the cartridge is connected to the grounded handle by the shaped metal retainer cap 26. The high voltage output electrode 27 of the cartridge connects via a metal spring 28 and pin 29 to a metal fluid shaft bushing 30. A metal fluid shaft section 31 sliding within bushing 30 passes current to a wire corona generating electrode 32 projecting through the needle 17 beyond the fluid nozzle 39. Externally generated electrical power is introduced to the electrode 19 by a special air hose and connector containing a power lead, which hose assembly is not shown.

Figure 3:
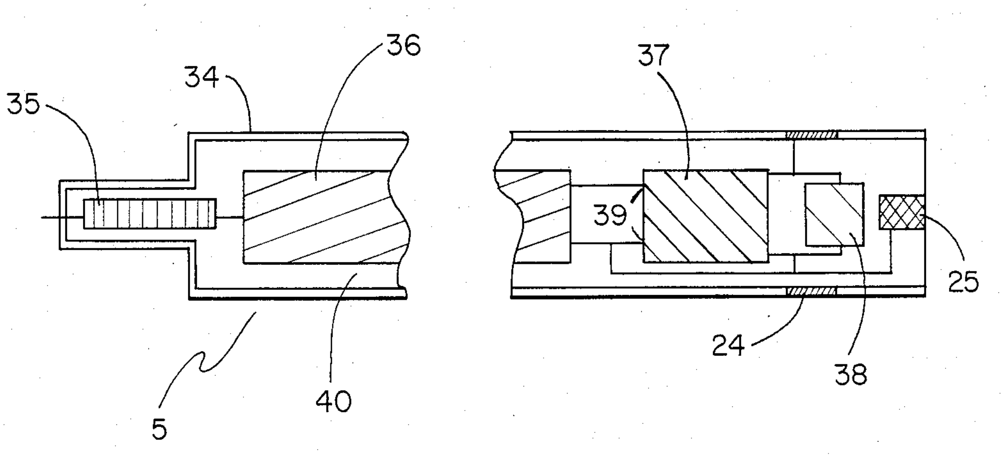
FIG. 3 is a schematic sectional view, of the cartridge of FIG. 2 including some of the power supply components included therein.

As best shown in FIG. 3 the cartridge 5 comprises a cylindrically shaped insulating shell 34 having disposed there within a protective limiting resistor 35 a series multiplier 36, a transformer 37, tuning choke 38, connector ring 24 and ground pin 25. Suitable mounting hardware, not shown, is used to support the transformer and tuning choke and the entire unit is encapsulated in an epoxy resin 40 of high dielectric strength.

Figure 4:
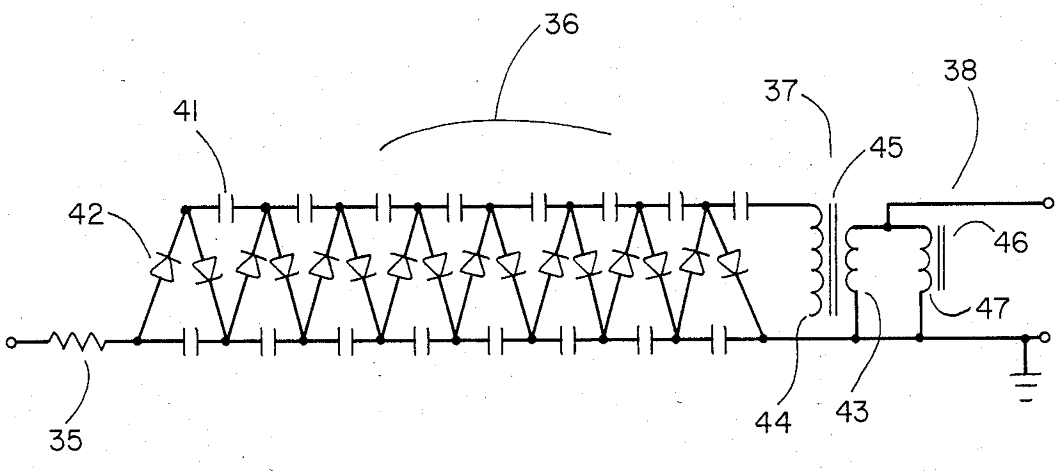
FIG. 4 is a schematic circuit diagram of the cartridge illustrated in FIG. 3.

Referring now to FIG. 4, the multiplier 36 is suitably an eight stage series type voltage multiplier utilizing 16 capacitors 41 and 16 diodes 42. The capacitors and diodes have working voltage ratings of at least 15 kilovolts for this configuration, a typical capacitor being Murata type DHR12YP33IMM15K and a typical diode being Varo type H-1701-15. The transformer 37 is suitably wound on a Magnetics Inc., P42510 EC ferrite core 45 using a multisection bobbin for insulation. The transformer primary 43 suitably comprises about 12 turns of 26 AWG wire and the secondary 44 of about 5600 turns of 44 AWG wire. The tuning choke 38, which is connected in parallel with the primary 43 of the transformer suitably comprises about 31 turns of 22 AWG wire 47 wound on a gapped Magnetics Inc., P 41808-EC ferrite core 46. The tuning choke functions to tune out the effective capacitance of the transformer and multiplier as viewed from the power supply and thus operates to minimize current which must be transmitted through the wire in the air hose. Typical input voltage to the cartridge may comprise 30 volts peak to peak at 16 Khz. The transformer output suitably comprises 14,000 volts peak to peak at 16 Khz and the multiplier output 85,000 volts DC.

Figure 5:
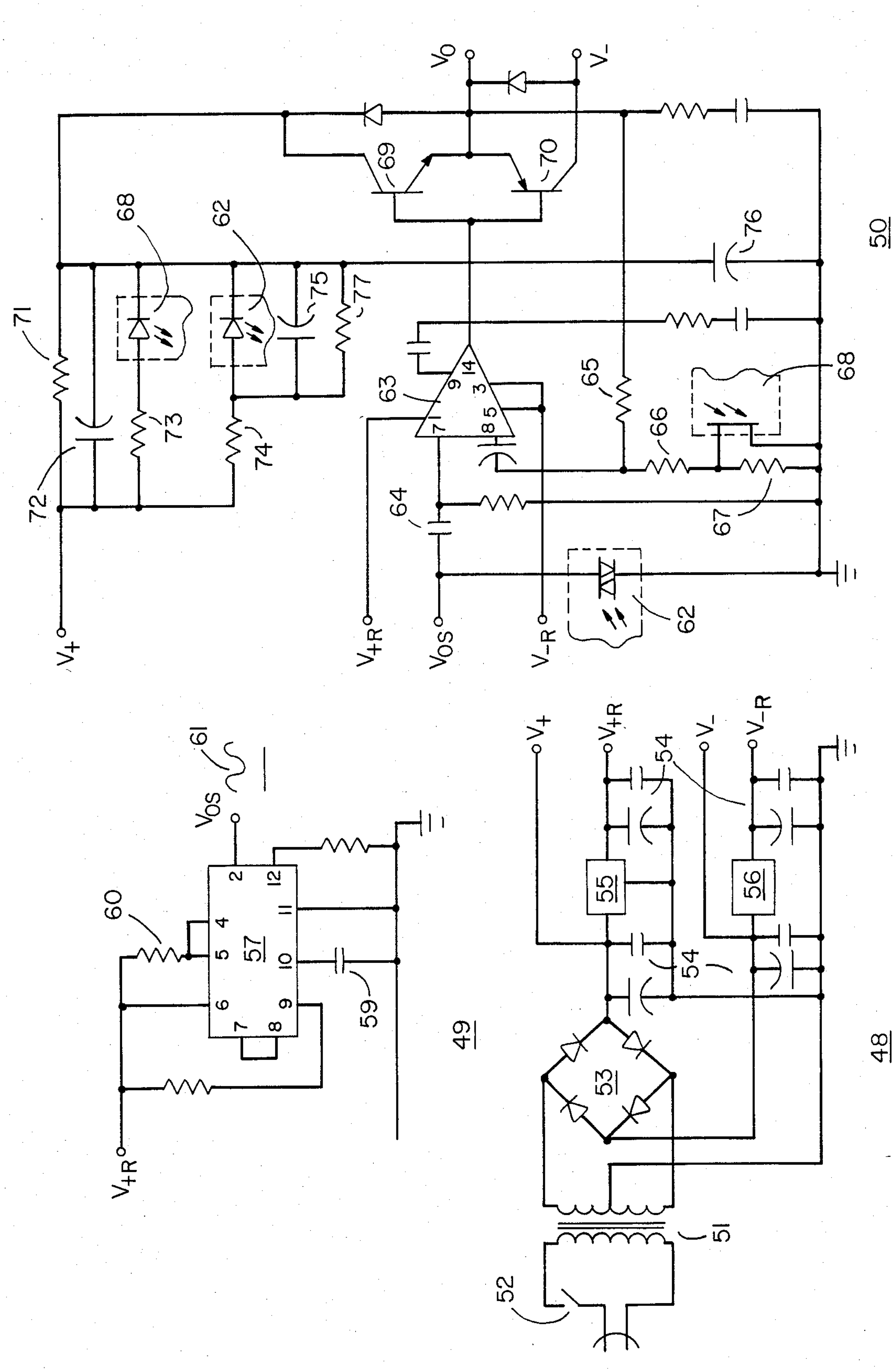
FIG. 5 is a schematic circuit diagram of a suitable remote power supply for operating in conjunction with the cartridge of FIGS. 3 and 5.

FIG. 5 illustrates a presently preferred circuit for the regulating components of the power supply adapted for use in conjunction with the cartridge of FIG. 4 and which serves to provide the desired regulation and shut down characteristics illustrated in FIG. 1.

As shown on FIG. 5 the illustrated circuit includes three principal elements, specifically comprising (1) the DC power supply generally designated 48, which serves to provide both positive and negative regulated DC voltage $V+_R$ and $V-_R$ and positive and negative unregulated but filtered DC voltages V+ and V−; (2) an oscillator generally designated 49 which is preferably with a DC bias, as shown in this embodiment; and (3) the power out control amplifier generally designated 50 which amplifies the voltage and current of the alternating voltage output component of the oscillator 49 to the desired levels to feed to the cartridge and provides the desired regulating functions.

The DC power supply comprises a transformer 51 supplied with 110 v, 60 cycle line voltage through a flow switch 52 activated only when air flow through the gun is triggered, a full wave DC rectifier bridge 53, capacitor filter 54, a three terminal positive voltage regulator 55 and a similar negative voltage regulator 56. The $V+_R$ and $V-_R$ power supply outputs are typically ∓18 volts, and the unregulated V+ and V− outputs are ∓25 volts.

The oscillator which preferably employs an integrated circuit function generator 57 typically an XR8038, provides a sine wave voltage output Vos at a frequency suitably 16 Khz, controlled by the timing capacitor 59 and the timing resistor 60. In the embodiment shown, the function generator 57 is supplied with positive voltage with respect to ground resulting in a positive DC bias in the alternating output as illustrated at 61. This is desirable since, as will be later explained, when shut down occurs through overload, an optically coupled triac assembly 62 functions to maintain the shut down until all power is removed, i.e., until the gun trigger is operated to deactivate the flow switch 52. Alternatively however, the function generator 57 may be supplied with both positive and negative regulated voltage in which case there will be no DC bias to the output signal. In such case when the sinusoidal wave reaches zero on the next cycle the triac 62 will be deactivated and under such conditions, if overload conditions no longer exist the output will automatically regenerate. The oscillator output Vos can typically be about 6 volts peak to peak with a 9 volt positive bias DC.

The control and power amplifier 50 broadly includes means to amplify both the voltage and current level of the low power alternating signal emanating from the oscillator 49 and associated sensing means to determine the load on the high voltage output of the power supply and to increase the gain or voltage amplification of the amplifier contained therein under increasing electrical load conditions in such manner that the output voltage of the multiplier increases by an amount approximately equal to the additional voltage drop in the protective resistor and multiplier caused by the increased current due to the increased electrical load. By such means the output voltage of the system remains approximately fixed under varying load conditions. Such sensing means is preferably, but not limited to, a resistor in one of the DC power lines supplying power to the amplifier. Current flow to the amplifier line increases with increasing electrical load at the high voltage output resulting in increasing voltage across the sensing resistor. Various means can be utilized to detect the voltage level to vary the amplifier gain. A particularly suitable feedback means is to place an optically coupled field effect transistor assembly in series with a resistor across the sensing resistor. Increasing voltage across the sensing resistor causes increased current to flow through the diode of the the optocoupler unit resulting in a reduction of resistance across the isolated field effect transistor. The field effect transistor is made part of a resistor network controlling the amplifier gain and whereas the amplifier gain is generally determined by the ratio of two resistors, by coupling the transistor across either resistor the gain can be made to increase or decrease with increasing load.

In a similar manner, the same load sensing resistor can be used to effect a shut down of the power supply whenever the load current exceeds a predetermined value. As will hereinafter became apparent in this embodiment, a resistor in series with an optically coupled triac assembly is a suitable, but not exclusive, means of achieving this end. The optically coupled triac operates in such a manner that, at a predetermined current level through the light emitting diode component thereof, the triac is triggered. If the triac is connected across the output of the oscillator the signal therefrom will be short-circuited. A further characteristic of the triac is that once such triac is triggered, it will remain in short-circuited condition until the current through the triac is reduced to a zero level. By feeding the oscillator 49 from one side of the DC supply only a DC bias will be and is imposed on the oscillator output signal which results in the basic operational parameter that, once triggered, the triac will remain conducting until all power to the oscillator is removed. Such requires a complete turn off of the power supply in order to reactivate the operation of the system, which turn off, as a prelude to reactivation, is a highly desirable safety feature.

Referring again to FIG. 5, the control and power amplifier 50 suitably comprises an integrated circuit preamplifier 63 which in the illustrated embodiment may be a TDA 2020 supplied with both positive and negative regulated DC voltage. The oscillator output voltage Vos is fed into the input of the amplifier through a capacitor 64, suitably about 0.1 microfarad, which blocks the DC bias of Vos. The preamplifier 63 increases the voltage of the incoming signal by an amount approximately proportional to the ratio of the resistance 65 to the combined impedance of resistors 66, 67 and the net output resistance of the field effect transistor component of a first optically coupled field effect transistor assembly 68. The absolute minimum amplifier gain, which will occur when the optocoupler assembly 68 is not activated, is $R_{65}$ divided by $(R_{66}+R_{67})$. The maximum gain, which will occur when the optocoupler assembly 68 is fully activated and thus substantially provides a short circuit bypass of R67 is $R_{65}$ divided by $R_{66}$. Resistors 65, 66 and 67 thus operate to limit the range of amplifier gain provided by the control circuit. Transistors 69 and 70 comprise the principle components in the output power amplifier portion of the circuit and serve to amplify the current, but not the voltage, output of the preamplifier 63. The power transistors 69 and 70 are supplied by the unregulated DC voltage outputs V+ and V− of the power supply 48 primarily to permit a significant voltage drop through the sensing resistor 71 without distortion of the output signal, but also to minimize current flow and heat generation in the voltage regulators 55 and 56.

The current flow into the power transistors 69 and 70 is determined primarily by the electrical load on the cartridge in the spray gun and is approximately equal from both positive and negative unregulated DC supplies. Sampling this current provides both a convenient and suitable means to determine the electrical load on the system both for the purposes of gain control to provide voltage regulation to the system and also to effect shut down under current overload conditions. While such current may be sampled from either positive or negative unregulated supply this embodiment effects such sampling from the positive voltage supply. Such current is drawn from the positive voltage supply only during the positive half of the output signal and for these purposes the voltage across resistor 71 is best smoothed to a constant DC level by a relatively large capacitor 72 connected in parallel therewith. A resistive value in the range of 1 to 10 ohms for resistor 71 has been found suitable and about 3.9 ohms is a satisfactory value. Similarly a suitable value for capacitor 72 is about 2200 microfarads. By the above action a stable DC voltage drop is thus created across resistor 71 whose magnitude is directly proportional to the average current drawn by transistor 69 and which in turn is essentially proportional to the electrical load on the total system.

It has been determined in practice and in a proto type of the system of the type herein disclosed that the average current drawn through resistor 71 varies from approximately 0.30 amperes when the cartridge 5 is under no electrical load to approximately 0.70 amperes when the cartridge 5 generates a current of 100 microamperes.

Disposed in parallel with the aforesaid resistor 71 is a resistor 73 in series with the light emitting diode component of the above described first optically coupled field effect transistor assembly 68. Also disposed in parallel with the aforesaid resistor is a resistor 74 in series with the light emitting diode components of a second optocoupler assembly 62, suitably an optically coupled triac, whose triac component is connected intermediate the oscillator output line and ground. The resistors 73 and 74 are selected to provide current levels to the light emitting components of the above described two optically coupled devices 68 and 62 of suitable magnitude.

The first field effect transistor optocoupler assembly 68 is suitably a GE H11F 1 optically coupled field effect transistor and, when installed in the circuit as shown in series with a resistor 73 of 47 ohms provides a suitable impedance variation in the net output resistance of the field effect transistor component which is connected across resistor 67, so as to vary the gain from approximately 6 when 0.30 amperes flow through the resistor 71 to approximately 9 when 0.70 amperes passes through the resistor 71. Suitable values of resistors 65, 66, and 67 to achieve these results are 24 Kohm, 2.4 Kohm and 1.5 Kohm respectively. In such exemplary system, when the amplifier gain reaches approximately eight, which corresponds to an approximate load of about 75 microamperes on the system, the amplifier will saturate and the output voltage will begin to "sag" as shown in FIG. 1.

The second optocoupler assembly 62 in the nature of an optically coupled triac, suitably a MOC 3011, operates with a series resistor 74 of approximately 200 ohms. With such a resistance value, the triac output of the optocoupler 62 triggers at a current flow of approximately 0.80 amperes through resistor 71, which current will correspond to a current load on the cartridge of approximately 110 microamperes. The triggering of the triac serves to short circuit the voltage output of the oscillator 49 to ground and to thus deactivate the power system. As previously pointed out, the basic operating characteristics of the triac are such as to be maintained in circuit closed or short circuit condition until the oscillator output is reduced to zero as by trigger manipulated system deactivation.

The above disclosed values suitably provide the desirable characteristic shape for the voltage-current curve characteristics of FIG. 1. The additional capacitors 75 and 76, which are typically about 2200 microfarads, are included to provide a delay period to prevent undesired activation or oscillation of the control circuits under sudden changes in load or upon initial turn on. The resistor 77, which is suitably about 390 ohms, serves as a bleed resistor for capacitor 75.

Values of other components in the circuits described, which have not otherwise been specified, are typically values which may be derived from standard data sheets relating to the integrated circuits contained therein.

Having thus described my invention, I claim:

1. In an electrostatic spray coating system wherein an electrode element is disposed adjacent the locus of coating material emission and said electrode element is subject to a desired magnitude of high voltage application thereto and to a load current flow therethrough dependent upon the physical parameters extant intermediate said locus of coating material emission and a workpiece being coated with said coating material, an improved power supply for the high voltage charging of said electrode element, comprising means for generating a low power, low voltage, high frequency alternating output, transformer and voltage multiplying means for providing a high voltage d.c. output for application to said electrode element, and power amplifying and control means disposed intermediate said generating means and said transformer and voltage multiplying means including means for varying the level of power output of said amplifier means for application to said transformer means in accord with the magnitude of the load current drawn through said electrode element to maintain the high voltage applied to said electrode substantially constant and independent of load for a predetermined range of load current values drawn therefrom.

2. The combination as set forth in claim 1 including means responsive to a predetermined magnitude of current flow through said electrode element for limiting the current output of said amplifying means to prevent the current flow through said electrode element from exceeding said predetermined magnitude.

3. The combination as set forth in claim 2 wherein said current output of said amplifying means is reduced to zero by deactivation of said power amplifying means when said current flow through said electrode element exceeds said predetermined magnitude.

4. The combination as set forth in claim 1 and wherein said power amplifying and control means includes means for sensing the magnitude of current flow through said electrode element, means responsive to the sensed magnitude of current flow through said electrode element for modifying the amplification of the voltage by said power amplifying means to maintain the desired magnitude of voltage applied to said electrode element from the output of said voltage multiplying means at a substantially constant value.

5. The combination as set forth in claim 4 wherein said means responsive to the sensed magnitude of current flow through said electrode element includes an optically responsive field effect transistor assembly.

6. The combination as set forth in claim 5 wherein said optically responsive field effect transistor assembly includes light emitting diode means responsive to the magnitude of current flow through said electrode element.

7. The combination as set forth in claim 6 wherein said optically responsive field effect transistor assembly further includes a field effect transistor whose net resistance output is inversely proportional to the amount of light emitted by said diode.

8. The combination as set forth in claim 3 wherein said means for deactivating said system includes means for sensing the magnitude of current flow through said electrode element, and means responsive to a predetermined magnitude of said current flow for interrupting the input voltage to said power amplifying and control means to reduce the output thereof to substantially zero.

9. The combination as set forth in claim 8 wherein said means responsive to the sensed magnitude of current flow through said electrode element includes an optically responsive triac assembly.

10. The combination as set forth in claim 9 wherein said optically responsive triac assembly includes light emitting diode means responsive to the magnitude of current flow through said electrode element.

11. The combination as set forth in claim 10 wherein said optically responsive triac assembly includes a triac unit whose resistance is determined by the amount of lights emitted by said light emitting diode.

12. In an electrostatic spray coating system wherein an electrode element is disposed adjacent the locus of coating material emission and said electrode element is subject to a desired magnitude of high voltage application thereto and to a load current flow therethrough dependent upon the physical parameters extant intermediate said locus of coating material emission and a workpiece being coated with said coating material, means for generating a high dc voltage for application to said electrode element.

means responsive to the magnitude of current flow through said electrode element for varying the magnitude of the voltage generated by said generating means to maintain the operating voltage of said electrode element at an essentially constant value over the named working range of the spray coating system.

13. The combination as set forth in claim 12 including means responsive to a predetermined level of current flow through said electrode element for controlling said generating means to limit the magnitude of said current flow to a value substantially below a predetermined maximum tolerable value thereof.

* * * * *